United States Patent [19]
Runciman

[11] 3,845,298
[45] Oct. 29, 1974

[54] OPTICAL SCANNING DEVICE

[75] Inventor: Herbert Morrison Runciman, Anniesland, Great Britain

[73] Assignee: Barr and Stroud Limited, Glasgow, Scotland

[22] Filed: Oct. 5, 1973

[21] Appl. No.: 404,125

[30] Foreign Application Priority Data
Oct. 25, 1972 Great Britain.................... 49119/72

[52] U.S. Cl....................... 250/236, 178/7.6, 350/7
[51] Int. Cl................................................ H01j 5/16
[58] Field of Search........... 250/563, 235, 236, 347; 350/6, 7; 178/7.6

[56] References Cited
UNITED STATES PATENTS

| | | | |
|---|---|---|---|
| 3,460,892 | 8/1969 | Dolin | 350/7 |
| 3,488,102 | 1/1970 | Buck | 350/7 |
| 3,604,932 | 9/1971 | Beach | 350/7 |
| 3,705,755 | 12/1972 | Baer | 250/236 |
| 3,765,743 | 10/1973 | Reaves | 178/7.6 |
| 3,775,619 | 11/1973 | De Jong | 250/347 |

*Primary Examiner*—Archie R. Borchelt
*Assistant Examiner*—D. C. Nelms
*Attorney, Agent, or Firm*—Mason, Fenwick & Lawrence

[57] ABSTRACT

An optical scanning device for composing a visual image of an infrared scene comprises a rotating body in the form of a drum carrying a plurality of pairs of orthogonal planar mirrors arranged such that for each mirror pair the line of intersection of the planes defined by the mirrors is disposed at right angles to the axis of rotation of the drum and tangential to a cylinder having its axis coincident with the drum rotation axis. The radiation detector is elongate and extends parallel to the drum rotation axis and when fixedly located midway between the drum rotation axis and the circumference of said cylinder a flat field is scanned independently of the rate of scan.

6 Claims, 6 Drawing Figures

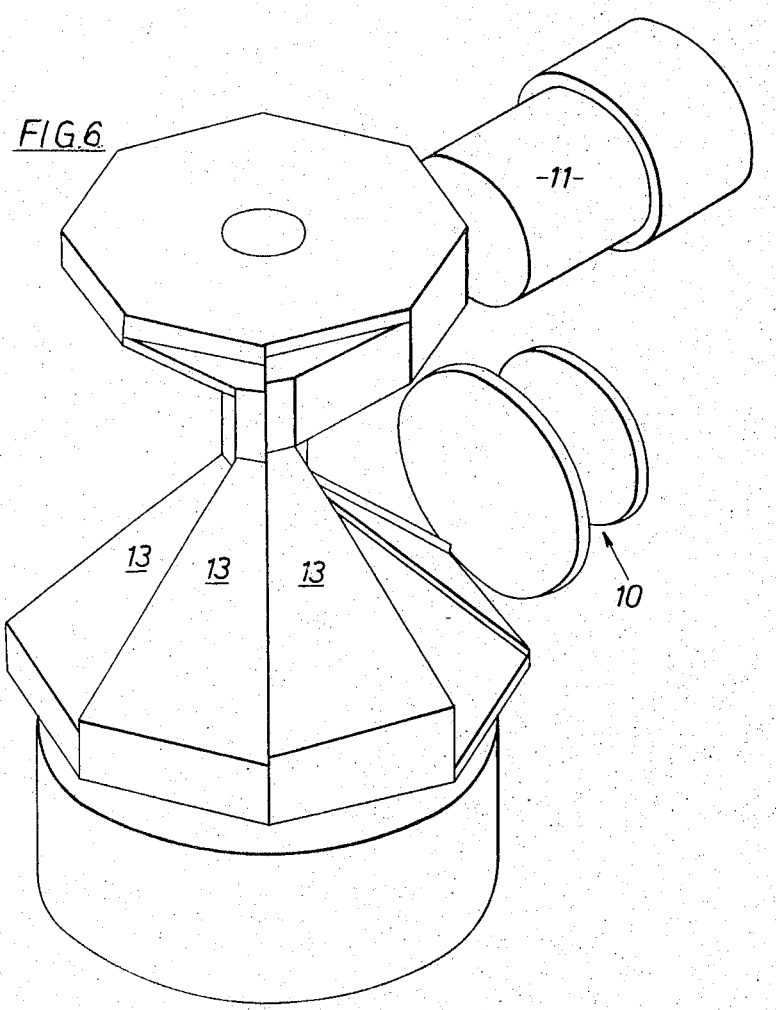

OPTICAL SCANNING DEVICE

This invention relates to optical scanning devices.

In optics there is a known requirement for a scanning device containing a detector which is sensitive to thermally produced radiation and which is connected to an electro-optical conversion device whereby a detected thermally produced image may be converted into a visual image. A known scanning device comprises a detector in the form of a large number of small detecting elements fixedly mounted adjacent each other in a linear fashion and a movable scanning mirror mounted to tilt about an axis at angles to the mirror surface and to the detector such as are necessary to permit free reception of radiation by the detector. When the mirror is caused to tilt angularly the detector is caused to scan across the field of view but in so doing the field of view which is scanned is not rectangular but, in general, is a distorted rectangle having its sides extending in the direction of scan curved and its other sides mutually inclined. If, as is frequently the case, the detector is caused to scan an image in a plurality of contiguous successive sweeps the scanned field of view also has a tapered edge formed because of the different orientation of the mirror with respect to its axis of rotation. Thus, three distortion effects are evident; individual scans produce a "bow" distortion, multiple scans produce a "taper" distortion and superimposed on the "taper" distortion is a so-called "Christmas tree" distortion caused by the taper of the end of each individual scan, this latter taper being at a different inclination from the taper produced in the total field of view. Due to the secondary scan motion the image of the detector is tilted out of the desired image surface so that the thermal image is no longer sharply focussed on all elements of the detector.

As a consequence of the use of the known scanning device the visual image produced at the output of the electro-optical conversion device is a distorted and defocussed version of the detected thermally produced image.

It is an object of the present invention to obviate or mitigate the above disadvantages by providing an optical scanning device wherein the abovementioned defects can be eliminated or maintained within predetermined limits.

According to the present invention there is provided an optical scanning device comprising an elongate detector and optical means for receiving and relaying radiation to be scanned, said detector and optical means each being fixedly mounted on a support, a plurality of optical members mounted to rotate around an axis parallel to the axis of the detector sequentially to intercept the radiation path between said optical means and said detector and adapted to scan said radiation and to relay scanned radiation to the input of the detector, each said optical member comprises two planar reflecting surfaces disposed substantially at right angles to each other, the line of intersection of the planes containing said two planar reflecting surfaces being disposed at right angles to said axis of rotation, the lines of intersection for each of the optical members being equidistant from the axis of rotation.

Embodiments of the present invention will now be described by way of example with reference to the accompanying drawings, in which:

FIG. 1 diagrammatically illustrates one form of optical scanning device according to the present invention;

FIG. 6 is a diagrammatic perspective view of a further embodiment of scanning device according to the present invention.

Figure 1:
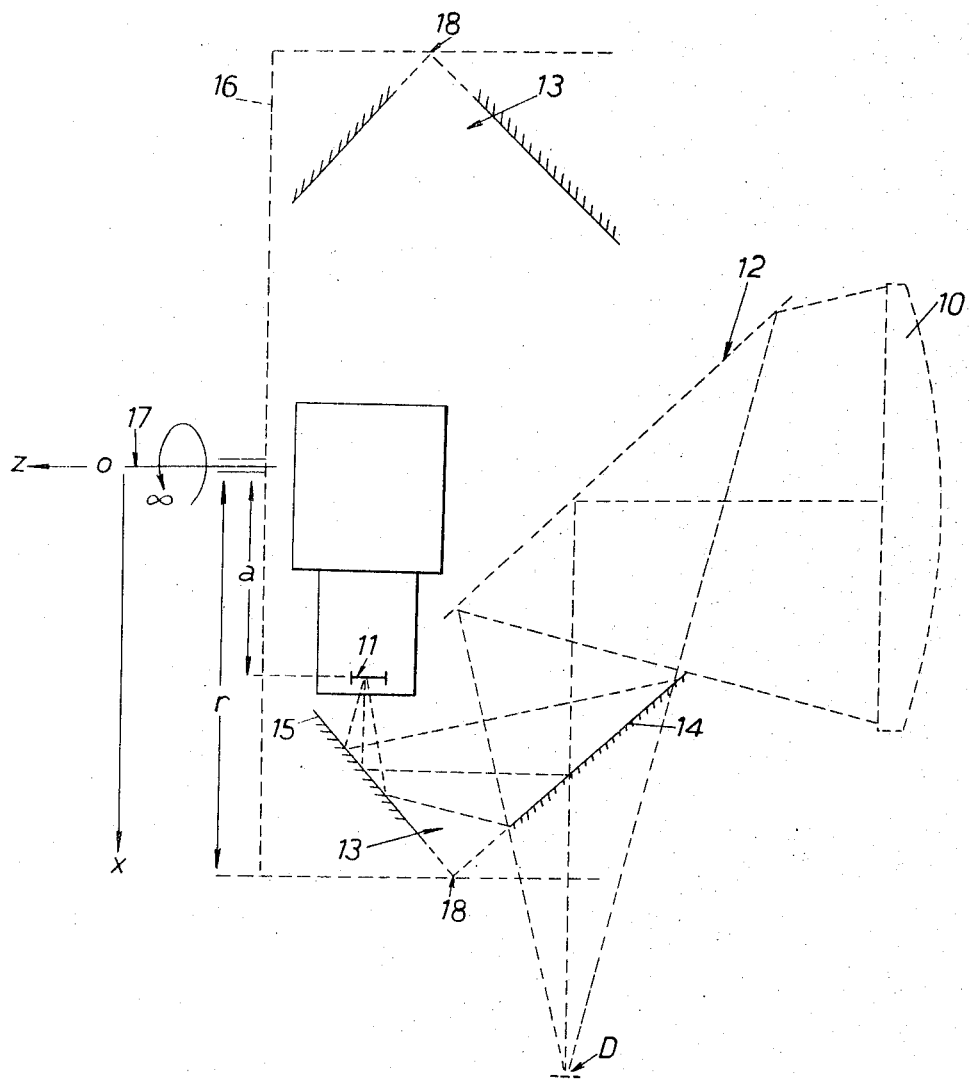

The optical scanning device illustrated in FIG. 1 comprises a lens 10 which focusses the received image-forming radiation on the surface of an array of linearly disposed detector elements forming an elongate detector 11. The radiation may be either thermally produced in which case it will be in the infra-red wavelength band or it may lie in the visible light wavelength band but in either case a suitably sensitive detector 11 is required.

Radiation entering the lens 10 is reflected from an optical reflector means in the form of a plane mirror 12 which is fixedly mounted on a support structure 9 (FIG. 2) on which the detector 11 is also mounted, and radiation from the mirror 12 is relayed to the detector 11 by one of a plurality of optical members 13 which in this embodiment are each in the form of two plane mirrors 14, 15 mounted at right angles to each other.

The members 13 are mounted around the periphery of a support drum 16 which is rotatable about an axis 17 parallel to the detector 11 and the members 13 are so arranged that the line of intersection 18 of the planes containing the mirror surfaces 14, 15 are each tangential to a cylinder having its axis coincident with the axis 17 and at right angles to the axis 17. Furthermore, these lines of intersection 18 are displaced axially of the cylinder, which may be coincident with the drum 16, from one member 13 to another so that, in operation, when the drum 16 is rotated the effect is to scan the detector 11 over different parts of the image-forming radiation in contiguous passes.

The scanning action of the above described device can be visualised by considering the movement of the image formed at D in FIG. 1 as the drum 16 is caused to rotate through a small angle $\theta$. It can be shown that the locus of D is given by $X_D = 2r \cos \theta - a \cos 2\theta$
$Y_D = 2r \sin \theta - a \sin 2\theta$ where the X-axis is as shown in FIG. 1 and the Y-axis is perpendicular to the plane of the FIG. and $a$ and $r$ are as indicated. Consequently the radius of curvature of the field in the neighbourhood of $\theta = 0°$ is given by $2(r-a)^2/r - 2a$ and may be set at zero, to give a flat field, by selecting $r = 2a$. Thus, if $r = 2a$ the detector 11 can be made, in effect, to sweep or scan across a substantially flat field in the primary direction by rotating the drum 16 through a small angle $\theta$. Scanning in the secondary direction is achieved by the axial spacing of the members 13 which spacing, preferably, is half the length of the detector 11; and the number of sweeps required to cover the entire field of view determines the minimum number of members 13 which are equiangularly disposed about the periphery of the drum 16.

Figure 2:
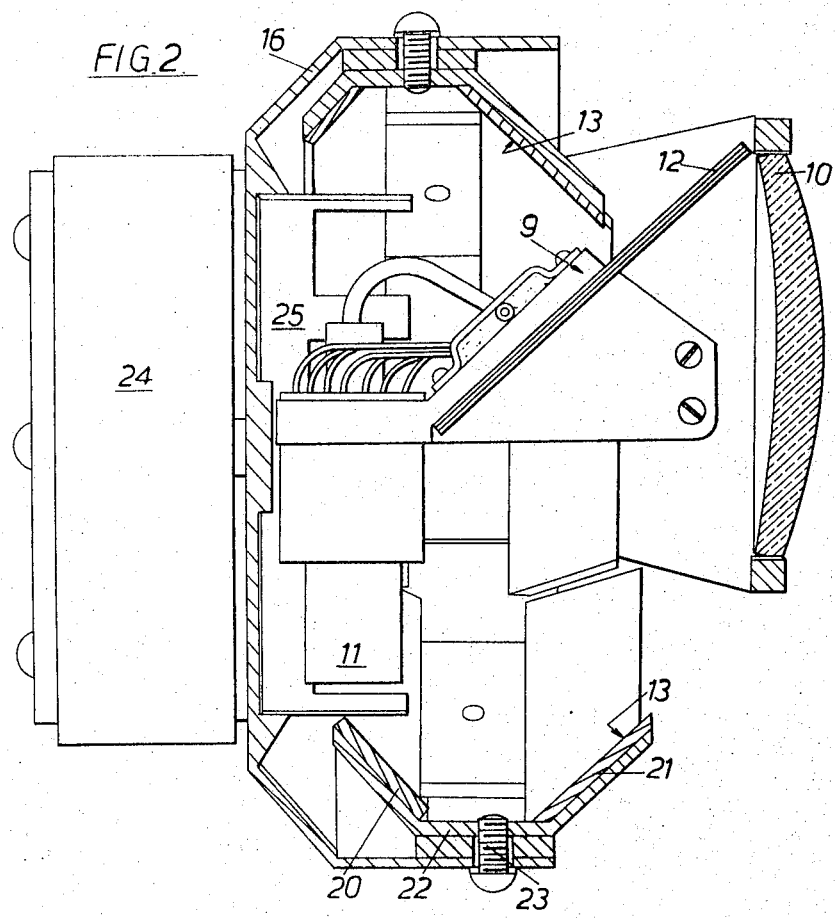
FIG. 2 shows a more practical form of the device of FIG. 1.

The device of FIG. 1 is shown in a more practical form in FIG. 2 wherein the members 13 are formed by two mirrors 20, 21 mounted on a support plate 22 which in turn is secured by a screw-threaded member 23 to the drum 16. The lens 10 and reflector 12 are also shown mounted on the support 9.

The drum 16 is mounted for rotation by a motor 24 and incorporates a radiation-intercepting device or chopper 25 which is positioned with upstanding portions arranged to pass immediately in front of the detector 11 to permit referencing of the detector 11 for radiation reflected from each pass of the devices 13.

Figure 3:
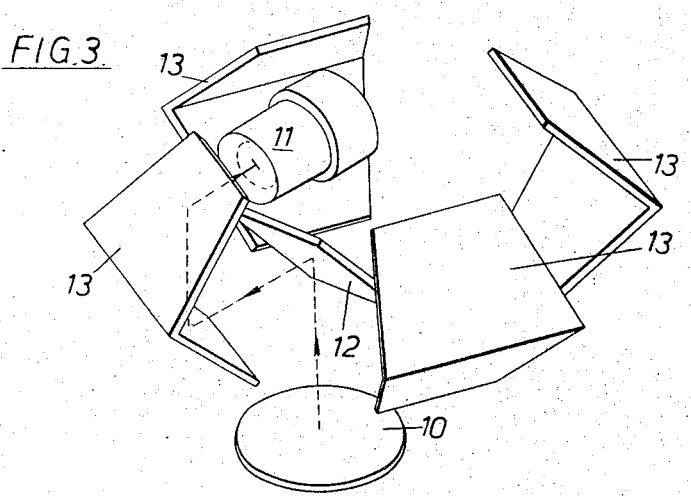
FIG. 3 is a diagrammatic perspective view of the device of FIG. 1.

FIG. 3 is a three-dimensional view which diagrammatically illustrates the disposition of the lens 10, the reflector 12, the members 13 and the detector 11 of FIG. 1 for the case where there are four members 13.

By virtue of the above-described embodiment the disadvantages inherent in the known scanning device are substantially eliminated in that the scanner has a flat-field and consequently is free of the three types of distortion and de-focussing prevalent in the prior art.

If a curved image surface is required this may be achieved in the primary scan direction by alteration of the value of $a$ in the abovementioned equation. If curvature in the Z direction is also required the angle between the mirror surfaces 14, 15 of the members 13 and the distances from the axis 17 of the lines of intersection 18 must be altered. This procedure introduces an amount of distortion dependent upon the curvature of the field.

Although to achieve a distortion free scan the surfaces 14,15 should be mutually perpendicular it is not required that the surfaces 14, 15 each lie at 45° to the axis of rotation 17 and likewise the reflector 12 need not lie at the angle illustrated and some advantages may be found in selecting different orientations of these elements.

Figure 4:
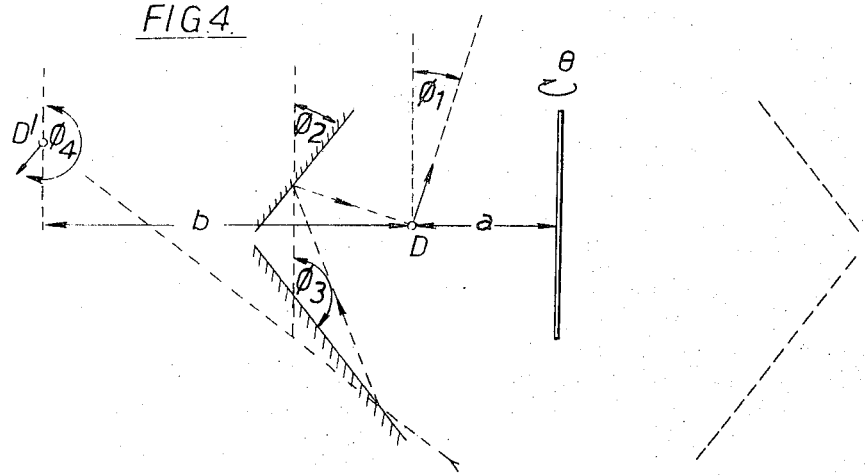
FIG. 4 is a diagram useful in understanding the mechanism of distortion in the device of FIG. 1.
Figure 5:
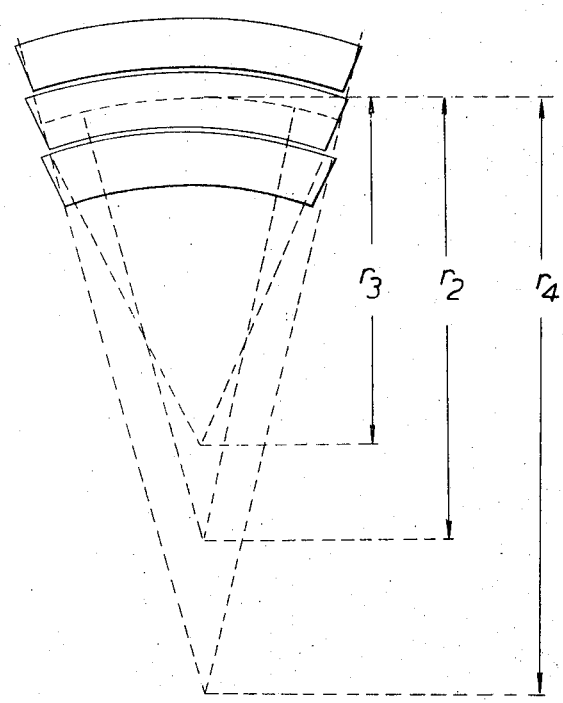
FIG. 5 illustrates the visual scan picture produced by distortion.

In order to estimate the severity of the amounts of various types of distortion produced by the device above-described when the parameters thereof are altered reference may be had to FIGS. 4 and 5, wherein $\phi_1$ is the angle between the detector and the rotation axis, $\phi_2$ is the angle between the 1st mirror and the rotation axis, $\phi_3$ is the angle between the 2nd mirror and the rotation axis, $\phi_4$ is the angle between the image and the rotation axis, $a$ is the perpendicular distance from detector to rotation axis, $b$ is the distance between the detector and its image (in a direction perpendicular to the rotation axis), $\theta$ is the angle of rotation.

At center of field, $\theta = 0$ and in the ideal case which has been described, $\phi_1 = 0$; $\phi_3 - \phi_2 = 90°$; $\phi_4 = 180°$ In general, it can be shown that:

Radius of Curvature of Image Surface $$r_1 = b^2/b \cdot \cos \phi_4 - 2a \cdot \sin(\phi_2 - \phi_3 + \phi_4) \cdot \sin(\phi_2 - \phi_3)$$

Radius of Bow Distortion $$r_2 = b^2/b \cdot \sin \phi_4 + 2a \cdot \cos(\phi_2 - \phi_3 + \phi_4) \cdot \sin(\phi_2 - \phi_3)$$

Radius of Array Image Convergence $$r_3 = b/\sin \phi_4 - \sin \phi_1$$

Radius of Picture Side Convergence $$r_4 = b/\sin \phi_4$$

Consequently, the range of values of parameters which will produce an acceptable result can be calculated and, for example, as will be appreciated by those skilled in the art, results comparable with those achieved by the prior art can be obtained with only 80° inclination between the surfaces of each of the members 13.

If a somewhat curved field is acceptable the embodiment of FIG. 6 may be utilised wherein the members 13 are mounted on a support drum 16 and the detector 11 is located externally thereof. This device provides maximum accessibility to the detector 11 and it eliminates the need for the reflector 12 but it suffers from vignetting of the image at the edge of the scanned field. In this embodiment, the optical means which receives and transmits the received radiation is in the form of a pair of lenses 10.

In a still further modification, not illustrated, the various relective surfaces are formed on the surfaces of prisms. Thus, for example, where there are only two reflective surfaces these may be formed from a roof prism.

Furthermore one of the main advantages of the scanning device of the present invention is that one can choose the required field curvature and scan rates independently of one another, and this permits a compact system to be designed with high efficiency.

What is claimed is:

1. An optical scanning device comprising an elongate detector, optical means for receiving radiation to be scanned, said optical means being arranged to direct said radiation along a radiation path to said detector, said detector and optical means each being fixedly mounted on a support, a plurality of optical members mounted to rotate around an axis which is parallel to the axis of the detector sequentially to complete the radiation path between said optical means and said detector and adapted to scan radiation emanating from the optical means and to relay scanned radiation to the input of the detector, each said optical member comprises two planar reflecting surfaces disposed substantially at right angles to each other, the line of intersection of the planes defined by said two planar reflecting surfaces being disposed at right angles to said axis of rotation, the lines of intersection for each of the optical members being equidistant from the axis of rotation.

2. A device according to claim 1, wherein said planar reflecting surfaces in each optical member are formed by a roof prism, the apices of the roof prisms for the optical members being equidistant from the axis of rotation.

3. A device according to claim 1, wherein said optical members are mounted on a supporting member having an open portion, the optical members being mounted around the periphery of said open portion and the detector being located within the open portion.

4. A device according to claim 1, wherein said optical members are mounted around the periphery of a supporting member and the detector being located externally of said supporting member.

5. A device according to claim 3, wherein said optical means comprises a focussing lens and a planar reflector.

6. A device according to claim 4, wherein said optical means comprises a focussing lens.

* * * * *